United States Patent Office 3,825,608
Patented July 23, 1974

3,825,608
STABILIZED HALOGENATED HYDROCARBONS
Kestutis A. Keblys, Southfield, Mich., assignor to Ethyl Corporation, Richmond, Va.
No Drawing. Filed Aug. 10, 1972, Ser. No. 279,439
Int. Cl. C07c 17/40
U.S. Cl. 260—652.5 R         3 Claims

ABSTRACT OF THE DISCLOSURE

Polybrominated hydrocarbons are stabilized by orthoesters such as orthoformates, orthoacetates, orthothioformates and orthothioacetates. For example, acetylene tetrabromide is stabilized with triethyl orthoformate and triethyl orthoacetate.

BACKGROUND OF THE INVENTION

Various substances are known to stabilize halogenated materials; for example, see U.S. 3,479,414, column 1, lines 36–55, and U.S. 3,265,747. Alkylene oxides and epihalohydrins are known to stabilize acetylene tetrabromide; German Patent 1,443,641. U.S. 3,061,584 teaches stabilizing resins containing acetylene tetrabromide. U.S. 2,371,647 teaches stabilization of chlorohydrocarbons with triethyl orthoformate and trimethyl orthoacetate. U.S. 3,564,061 teaches these stabilizers can be admixed with other materials such as tribromoethane and 1,2-dibromopropane.

SUMMARY OF THE INVENTION

This invention pertains to stabilized composition of the following type: A brominated hydrocarbon having up to about 4 carbons and at least two bromine atoms bonded to each carbon atom containing a small but effective amount of a stabilizer selected from compounds having the formula

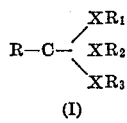

(I)

wherein X is oxygen or sulfur, R is hydrogen or an alkyl radical of up to about 4 carbon atoms, and $R_1$, $R_2$ and $R_3$ are hydrocarbyl groups selected from the class consisting of alkyl, cycloalkyl, alkenyl, aryl, and aralkyl groups having up to about 9 carbon atoms.

A preferred embodiment is acetylene tetrabromide containing a small but stabilizing amount of an alkyl orthoformate wherein all three alkyl groups are the same and each contain from 1 to about 4 carbon atoms.

Another preferred embodiment is acetylene tetrabromide containing a small but stabilizing amount of an alkyl orthoacetate wherein all three alkyl groups are the same and each contain up to about 4 carbon atoms.

A more preferred embodiment is acetylene tetrabromide stabilized with triethyl orthoformate or triethyl orthoacetate.

DESCRIPTION OF PREFERRED EMBODIMENTS

This invention pertains to stabilization of brominated hydrocarbons which are susceptible to deterioration upon standing. Of these, the invention pertains especially to bromine compounds with at least two bromines bonded to each carbon atom. The brominated materials of main interest have more than one carbon atom per molecule.

Aliphatic materials are stabilized by this invention. Of these, alkyl compounds are preferred. Most preferred compounds are alkyl derivatives of up to about 4 carbon atoms.

Of these compounds, those containing at least two carbons are preferred. However, the stabilizers of this invention can be added to bromoform and carbon tetrabromide, if desired. Of the brominated materials, those solely composed of carbon, hydrogen and bromine are preferred. However, the prebrominated materials of two or more carbons such as $Br_3C$—$CBr_3$, $CBr_3$—$CBr_2$—$CBr_3$ and $Br_3C$—$CBr_2$—$CBr_3$ and be admixed with stabilizers of this invention, if desired. Of the hydrogen-containing materials, acetylene tetrabromide, $CHBr_2$—$CHBr_2$, is highly preferred.

Generally, any orthoester which stabilizes a halogenated species, as described above, can be used in this invention. The preferred additives are soluble in the amounts employed. More preferably, the additives should not react or otherwise decompose, whereby the stabilization is diminished to an undesirable extent during the period for which stabilization is desired.

The preparation of orthoesters is well known in the art. Ample description of the various methods of preparation may be found in Wagner et al., Synthetic Organic Chemistry, John Wiley and Sons, New York, N.Y. (1953), Chapter 16, pages 542–545, and Post, The Chemistry of the Aliphatic Orthoesters, Reinhold Publishing Corp., New York, N.Y. (1943), Chapter 2, pages 11–43. The various examples of orthoformates and orthothioformates contained in Table 60, Wagner et al., supra, and Tables 1–5, Post, supra, are incorporated herein as if fully set forth.

Below are listed non-limiting examples of hydrocarbyl groups which may be present in the above general formula as Groups $R_1$, $R_2$, and $R_3$. These groups may be present irrespective of whether the orthoesters are orthoformates or orthothioformates, orthoacetates, orthothioacetates, or other stabilizing orthoester. In this regard, the below listed groups can also be present in mixed orthoesters. For purposes of this invention, mixed orthoesters are those of Formula (I) above where one or two atoms indicated by "X" are oxygen and the remaining X atoms are sulfur.

Examples of alkyl groups represented by Groups $R_1$–$R_3$ in the above general formula are methyl, ethyl, n- propyl, isopropyl, n-butyl, isobutyl, sec-butyl, tert-butyl, n-amyl, and the various positional isomers thereof, and likewise the corresponding straight and branched chain isomers of hexyl, heptyl, octyl, nonyl, decyl, undecyl, dodecyl, and the like.

When said Groups $R_1$–$R_3$ are cycloalkyl groups, they may be cyclopropyl, cyclobutyl, cyclopentyl, cyclohexyl, cycloheptyl, cyclooctyl, cyclononyl, cyclodecyl, cycloundecyl, cylododecyl, and the like. They may also be such cycloaliphatic groups as α-cyclopropyl-ethyl, α-cyclobutylpropyl, and similar alkyl derivatives of the higher cycloalkyls.

The Groups $R_1$–$R_3$ in the above general formula may also be alkenyl groups such as ethenyl, 1-propenyl, 2-propenyl, isopropenyl, 1-butenyl, 3-butenyl, and the corresponding branched-chain isomers thereof as, for example, 1-isobutenyl, 2-isobutenyl, 2-sec-butenyl, including 1-methyle-1c-2-propenyl, and the various isomers of pentenyl, hexenyl, heptenyl, octenyl, nonoyl, decenyl, undecenyl, a ut dodecenyl, including 3,3-dimethyl-1-butenyl, 2,3-dimethyl-1-butenyl, 2,3-dimethyl-2-dimethyl-2-butenyl, 2,3-dimethyl-3-butenyl, 1-methyl-1-ethyl-2-propenyl, and the like.

When the R groups are alkaryl groups, they may be 2,3-xylyl, 2,4-xylyl, 2,5-xylyl, 2,6-xylyl, 3,4-xylyl, 3,5-xylyl; o, m, and p-cumenyl, mesityl, o, m, and p-ethylphenyl, 2-methyl-1-naphthyl, 3-methyl-1-naphthyl, 4-methyl-1-naphthyl, 5-methyl-2-naphthyl, 6-methyl-3-naphthyl, 7-methyl-1-naphthyl, 8-methyl-4-naphthyl, 1- ethyl-2-naphthyl, and its various positional isomers, and the like.

Examples of aryl groups which may be present in the above general formula are phenyl, naphthyl, and the like.

When said Groups $R_1$-$R_3$ are aralkyl groups, they may be benzyl, phenylethyl, 1-phenylpropyl, 2-phenylpropyl, 3-phenylpropyl, 1 and 2 isomers of phenylisopropyl, 1, 2, and 3 isomers of phenylbutyl and the like.

Such compounds suggest the use of stable related compounds in which the Groups $R_1$, $R_2$ and $R_3$ contain a non-hydrocarbon substituent. Exemplary radicals of this type are disclosed in Coffield U.S. 3,318,812, column 3, line 14 to column 4, line 37. The description of orthoesters in Coffield, *supra*, is incorporated by reference herein as if fully set forth.

Of the stabilizers set forth above, the orthoformates and orthoacetates are preferred. In other words, preferred compounds are those with the above structural formula where X is oxygen and R is hydrogen or a methyl group. Of these compounds, the preferred ones have equivalent $R_1$, $R_2$ and $R_3$ groups; that is, $R_1$, $R_2$ and $R_3$ are the same. Trialkyl orthoformates and orthoacetates are preferred, more preferably those in which esterifying R groups have 1–6 and more preferably 1–4 carbons. Triethyl orthoformate is a preferred stabilized. Another is triethyl orthoacetate.

Although one stabilizer can be used, the halogenated hydrocarbons can be stabilized with mixtures of orthoesters and/or orthothioesters of the type described above. Two, three or more esters can be used as the stabilizer additive. A suitable mixture is $HC(OCH_3)_3$ and $HC(OC_2H_5)_3$.

A stabilizing amount of stabilizer is employed. The amount used can be varied and is dependent, at least to some extent, on the nature of the halogenated material being stabilized and the activity of the stabilizer. By tests, such as described below, stabilization achieved by various additive concentrations can be observed. With the data obtained, a skilled practitioner can select the desired concentration. In general, the amount of stabilizer is less than 10 weight percent, usually less than 1 percent and preferably from 10 to 10,000 p.p.m. by weight. A more preferred concentration range is from about 50 to about 8000 p.p.m.; most preferably from about 500 to about 5000 p.p.m. by weight.

The stabilizer additive and halogenated material to be stabilized can be admixed in any known manner. The mixture can be heated to facilitate solution, if desired.

EXAMPLE 1

A blank run was made by heating 75 ml. of acetylene tetrabromide at 75° for two hours. The material was cooled to room temperature and a 15 ml. aliquot was taken. This was shaken with 45 ml. of water for one minute. The aqueous phase was collected and diluted to 50 ml. It was analyzed for $Br^-$ as NaBr. The remaining organic phase was checked for APHA color.

The additives were tested at a concentration of 3000 p.p.m. under the same conditions (75° for 2 hours). They were worked up in the same manner as the blank.

The following results were obtained:

| | p.p.m. Br⁻ as NaBr | APHA color |
|---|---|---|
| Blank | 49 | 204 |
| (EtO)₃CCH₃ | 11.2 | 76 |
| (EtO)₃CH | 9.7 | 83 |

Similar results are obtained when the triethyl orthoformate and triethyl orthoacetate are replaced with dimethylpropyl orthoformate, methyl ethyl butyl orthoformate, tripentyl orthoformate, tridecyl orthoformate, trinonyl orthoformate, tricyclohexyl orthoformate, triethenyl orthoformate, tricyclopentadienyl orthoformate, tri-3,4-xylyl orthoformate, tri(3-propylphenyl)orthoformate, tri(3-phenylpropyl) orthoformate, and the orthothioformate, orthoacetate, orthothioacetate, orthobutyrate, and orthothiobutyrate analogs of these compounds. Similar results are obtained when a mixture of trimethyl orthoformate and triethyl orthoformate is used. Similar results are obtained when the above compounds are used in concentrations of from 500 to 5000 p.p.m.

Similar results are obtained when the above orthoester compounds, in the above amounts, are used and the acetylene tetrabromide is substituted with, one at a time, $CBr_4$, $CHBr_3$, $CH_2Br_2$, $Br_3C$—$CBr_3$, $CBr_3$—$CBr_2$—$CBr_3$, $CHBr_2$—$CBr_2$—$CHBr_2$, $Br_2HC$—$CBr_2$—$CBr_2$—$CHBr_2$ and $CBr_3$—$CBr_2$—$CBr_2$—$CBr_3$.

Similarly, the above orthoesters can be used to form mixtures which stabilize acetylene tetrabromide and analogous halogenated hydrocarbons. In other words, one or more of the above orthoesters can be mixed with other stabilizers. In such mixtures, the relative amounts of the stabilizers are not critical. Thus, the relative amounts are selected by such considerations as economics, degree of stabilization desired, compatibility of the admixed stabilizers with themselves and the substrate to be stabilized, and the like. In general, good results are obtained if the total concentration of stabilizer is from about 1000 to about 6000 p.p.m. by weight, and the proportion of the above orthoesters in the stabilizing mixture is at least about 50 percent, i.e. at least about half of the added stabilizing composition is orthoester or orthothioester.

With such considerations in mind, mixtures of the above orthoesters and orthothioesters can be formulated with, for example (A) A compound such as styrene oxide and the substituted styrene oxides having the formula

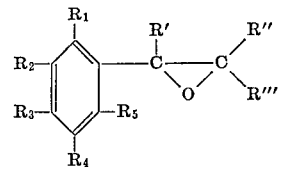

wherein $R_1$–$R_5$ and $R'$–$R'''$ are independently selected from hydrocarbyl radicals of the type mentioned above when discussing the orthoesters and up to about 14 carbons such that the total number of carbon atoms in the molecule does not exceed about 16. Of these, α-methylstyrene oxide, β,β-dimethylstyrene oxide, p-butylstyrene oxide, and p-tetradecylstyrene oxide are illustrative examples;

(B) Epibromohydrin, epichlorohydrin and alkylene oxides such as those within German Pat. 1,443,461. Of these alkylene oxides, propylene oxide is typical;

(C) Glycidyl ethers, such as phenyl glycidyl ether and other ethers disclosed in U.S. 3,031,410;

(D) 1,1,3,3-Tetramethoxypropane and related materials of the formula

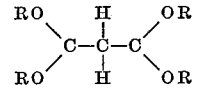

where the various R's are alkyl groups of up to about 14 carbons selected so at least one has two or more carbons, and the other hydrocarbyl groups discussed above, and (E) Acetylenic alcohols, such as methyl pentynol, of the formula

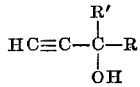

EXAMPLE 2

Illustrating the activity of mixtures, tests were conducted by preparing

A blank—a nonstabilized acetylene tetrabromide specimen (1)—acetylene tetrabromide and 1500 p.p.m. each of triethylorthoformate and styrene oxide, and
(2)—acetylene tetrabromide and 1500 p.p.m. each of triethyl orthoformate and epibromohydrin After preparation, and after storage at 110° F. for four days, the pH, APHA color, and bromide content ($B_1^-$ as NaBr) were measured.

For pH, a 15 ml. sample is shaken with 45 ml. of neutral, deionized water. After the phases have separated for at least five minutes, the pH of the aqueous phase is measured.

For bromide, the aqueous phase after measuring the pH is transferred to a 50 ml. volumetric flask and diluted to the mark with $H_2O$. A 20 ml. aliquot is mixed with 40 ml. of isopropanol, and 5 ml. of 50 percent nitric acid solution. The mixture is titrated with 0.01N $AgNO_3$ solution. Blanks are also titrated.

The results were as follows:

| | NaBr, p.p.m. | | APHA color | | pH | |
|---|---|---|---|---|---|---|
| | Initial | 4 day | Initial | 4 day | Initial | 4 day |
| Blank | 10.3 | 11.8 | 42 | a 80 | 3.5 | 3.2 |
| Sample 1 | 7.4 | 7.9 | 57 | 22 | 3.9 | 4.0 |
| Sample 2 | 10.9 | 7.2 | 67 | 25 | 3.6 | 3.6 | a Sample had to be filtered since polyethylene cap of sample bottle turned black and sample had clouded.

The APHA color value was determined after 11 days. The blank, Sample 1, and Sample 2 values respectively were 112, 25 and 32 p.p.m.

These results show stabilization of acetylene tetrabromide over the four day interval with stabilizing mixtures of Samples 1 and 2.

This invention can be extended to use of aromatic orthoesters exemplified by those in the tables referred to in Post, *supra*.

I claim:
1. A stabilized composition consisting essentially of acetylene tetrabromide and from about 500 to about 5000 parts per million by weight of a compound having the formula

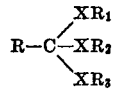

wherein R is hydrogen or methyl and $R_1$, $R_2$ and $R_3$ are the same and are selected from alkyl groups having from up to about four carbon atoms and X is oxygen.

2. A composition of Claim 1 wherein said compound is triethyl orthoformate.
3. A composition of Claim 1 wherein said compound is triethyl orthoacetate.

References Cited

UNITED STATES PATENTS

| | | | |
|---|---|---|---|
| 3,564,061 | 2/1971 | Correid et al. | 260—652.5 R |
| 2,371,647 | 3/1945 | Petering et al. | 260—652.5 R X |
| 2,371,645 | 3/1945 | Aitchison et al. | 260—652.5 R |
| 3,536,766 | 10/1970 | Mogford | 260—652.5 R |
| 3,265,747 | 8/1961 | Cormany et al. | 260—652.5 R |
| 3,549,715 | 12/1970 | Cormany et al. | 260—652.5 R |
| 3,031,410 | 4/1962 | Petering et al. | 260—652.5 R |
| 2,973,392 | 2/1961 | Graham | 260—652.5 R |

FOREIGN PATENTS

| | | | |
|---|---|---|---|
| 1,443,641 | 7/1971 | Germany | 260—652.5 R |

HOWARD T. MARS, Primary Examiner

UNITED STATES PATENT OFFICE
CERTIFICATE OF CORRECTION

PATENT NO. : 3,825,608
DATED : July 23, 1974
INVENTOR(S) : Kestutis A. Keblys

It is certified that error appears in the above-identified patent and that said Letters Patent are hereby corrected as shown below:

Column 1, line 38, cancel the formula there given and replace it with the following:

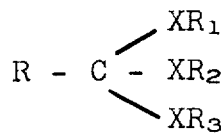

Column 2, line 8, cancel "$Br_3C-CBr_2-CBr_3$"

Signed and Sealed this ninth Day of September 1975

[SEAL]

Attest:

RUTH C. MASON
*Attesting Officer*

C. MARSHALL DANN
*Commissioner of Patents and Trademarks*